United States Patent [19]

Tokudome et al.

[11] 4,232,274
[45] Nov. 4, 1980

[54] METAL VAPOR LASER SYSTEM

[75] Inventors: Katumi Tokudome, Saitama; Michio Ishikawa, Kawagoe; Shuzo Hattori, Nagoya, all of Japan

[73] Assignee: Kimmon Electric Co., Ltd., Tokyo, Japan

[21] Appl. No.: 910,349

[22] Filed: May 30, 1978

[51] Int. Cl.$^2$ .............................................. H01S 3/13
[52] U.S. Cl. ........................... 331/94.5 S; 331/94.5 D; 331/94.5 T
[58] Field of Search ..................... 331/94.5 G, 94.5 S, 331/94.5 D, 94.5 T

[56] References Cited

U.S. PATENT DOCUMENTS

| | | | |
|---|---|---|---|
| 3,822,086 | 7/1974 | Paik | 331/94.5 T X |
| 3,876,957 | 4/1975 | Thatcher | 331/94.5 T |

FOREIGN PATENT DOCUMENTS

52-41157  10/1977  Japan ................................. 331/94.5 T

*Primary Examiner*—James W. Davie
*Attorney, Agent, or Firm*—Frishauf, Holtz, Goodman & Woodward

[57] ABSTRACT

A metal vapor laser discharge system includes a metal vapor laser and its associated circuit. The metal vapor laser discharge system is provided with a laser vessel which includes a discharge narrow tube filled with ionizable helium gas, the Brewster windows attached to both ends of the laser discharge narrow tube, and cathode and anode electrodes disposed in two branch tubes communicating with the discharge narrow tube. A metal reservoir is provided near the anode electrode and metal such as cadmium (Cd) is placed in the metal receiver. A helium supplemental container is coupled with the laser discharge narrow tube, through a helium passing wall. A high voltage circuit is connected between the anode and cathode electrodes. A heater provided around the metal reservoir is connected to a metal vapor supply circuit which controls current supplied to the heater to maintain the concentration of the ionizable metal vapor in the discharge narrow tube constant in the laser discharge narrow tube. The helium gas pressure in the discharge narrow tube is detected by a pressure detecting element. The output signal of the pressure detecting element is inputted to a helium gas supplemental circuit. The helium gas supplemental circuit controls current fed to a heater around the helium gas supplemental container to maintain constant the helium gas pressure in the discharge narrow tube. A constant current circuit is connected between the anode and cathode electrodes to keep the discharge current constant.

14 Claims, 11 Drawing Figures

METAL VAPOR LASER SYSTEM

BACKGROUND OF THE INVENTION

The invention relates to a metal vapor laser discharge system and, more particularly, to a laser system including a cataphoresis type metal vapor laser.

The metal vapor laser is known as a laser developing a mixing discharge in a discharge tube filled with helium (He) gas and metal vapor of cadmium Cd, for example, as a medium. The metal vapor laser now commercially available is roughly classified into three types: helium and cadmium combination, helium and celenium combination, and helium and iodine combination. Other known metal vapor lasers now in the experimental and studying stage are helium and zinc, helium and tellurium, helium and mercury, helium and arsenic, helium and tin, and the like.

From a structural viewpoint, the metal vapor laser is categorized into an oven laser, hollow cathode laser, and a cataphoresis laser. The former two lasers are not used at present for various reasons and only the latter cataphoresis laser is practically used.

The output characteristic of the cataphoresis type laser having maturely been studied depends on the helium pressure in the laser tube, the concentration of metal vapor, i.e. the metal vapor pressure, and current density, i.e. the discharge current in the laser tube. In order to obtain a stable and maximum laser output, it is necessary to optimize these factors. However, such an optimization was difficult in the conventional laser system. For this, the conventional laser is unstable in output and short in life time. In laser oscillation, the metal vapor moves due to a cataphoresis effect and cools down near the cathode electrode to be condensed onto the inner surface of the laser discharge tube around the electrode. The result is reduction of the concentration of the metal evaporation in the laser discharge tube. During the laser oscillation, helium gas is diffused along the inner surface of the laser discharge tube and the metal vapor is condensed onto the inner surface of the tube. At this time, helium atoms are absorbed into the metal, with the result that the helium pressure is reduced.

Several attempts have been made to overcome such problems but these attempts have been unsuccessful.

SUMMARY OF THE INVENTION

Accordingly, an object of the invention is to provide a metal vapor laser discharge system capable of continuing a stable laser oscillation for a long period.

Another object of the invention is to provide a metal laser discharge system capable of performing a laser oscillation at the maximum output with low noise.

Accordingly, there is provided a metal vapor laser discharge system including a metal vapor laser discharge means and control means for the metal vapor laser discharge means. The metal vapor laser discharge means comprises: a laser vessel filled with ionizable helium gas; anode and cathode electrodes which are disposed in the laser vessel with a space therebetween for forming a discharge path; a gas pressure detecting element for detecting the helium pressure in the laser vessel; a metal reservoir containing metal for supplying an ionizable metal vapor into the laser vessel; a helium gas supplemental container which is coupled with the discharge laser vessel through a helium gas passing wall permitting helium gas to diffuse due to heating and to pass therethrough, and is filled with the helium gas at a higher pressure than that in the laser vessel. The control means for the metal vapor laser discharge means comprises: constant current means which is connected between the anode and cathode electrodes and maintains substantially constant the discharge current between the anode and cathode electrodes; metal vapor supply means for controlling a metal heating means which is provided around the metal receiver in accordance with the discharge voltage between the anode and cathode electrodes to maintain substantially constant the metal vapor in the laser vessel; and helium gas supplemental means for controlling the heating means for heating the helium gas passing wall of the helium gas supplemental container in accordance with the output signal from the gas pressure detecting element to maintain substantially constant the helium gas pressure in the laser vessel.

DESCRIPTION OF THE PREFERRED EMBODIMENT

Figure 1:
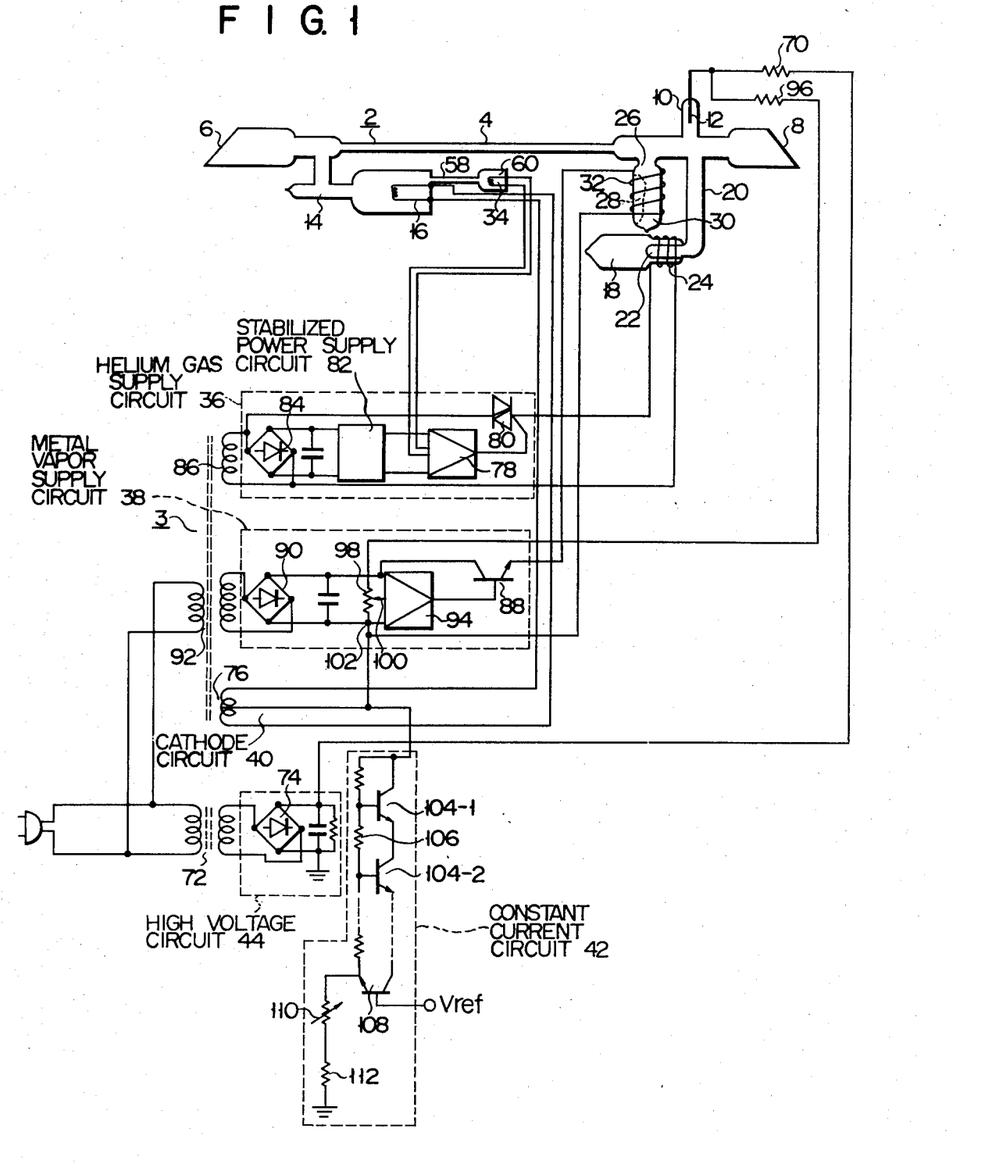
FIG. 1 shows a circuit diagram of an embodiment of a metal vapor laser discharge system according to the invention.
Figures 2, 3:
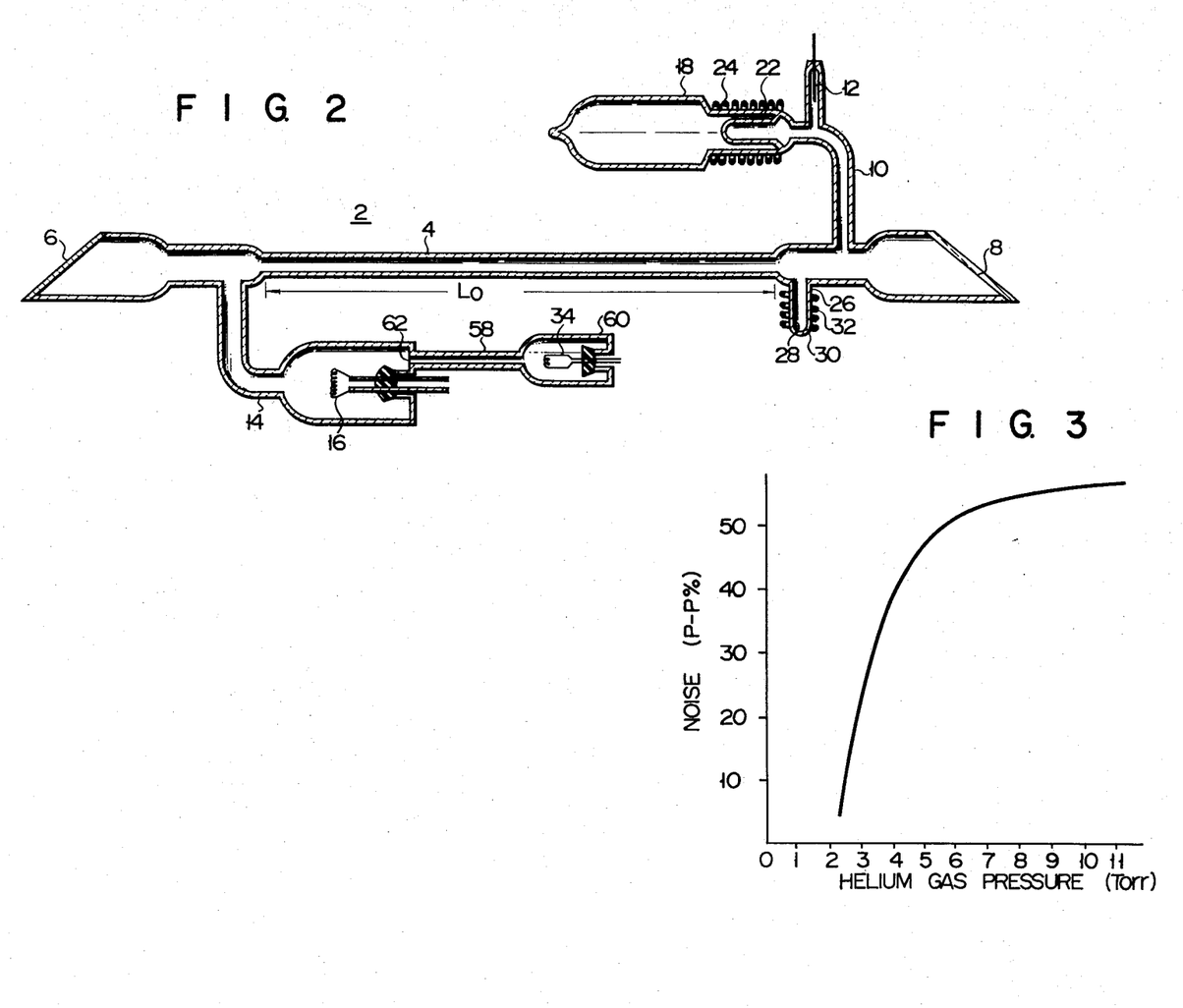
FIG. 2 is a longitudinal cross sectional view of a metal vapor laser which is an embodiment of the invention.
FIG. 3 is a graph illustrating the relationship between noise in the laser output and helium gas.

Reference is now made to FIG. 1 illustrating an embodiment of a metal vapor laser discharge system according to the invention. As shown, the metal vapor laser discharge system includes a metal vapor laser 2 and its associated circuit 3. The metal vapor laser 2 includes a laser vessel having branch tubes 10, 14, 20, a laser discharge narrow tube 4 made of quartz glass in which ionizable helium gas is sealed as best illustrated in FIG. 2 and Brewster windows 6 and 8 hermetically attached at both ends of the laser discharge narrow tube 4. Internal mirrors may be used in place of the Brewster windows. The first branch tube 10 provided in the vicinity of one end of the laser discharge tube 4 is continuous to the discharge tube 4. An anode electrode 12 is disposed in the first branch tube 10. Near the other end of the laser discharge narrow tube 4, is provided the second branch tube 14 continuous to the discharge narrow tube 4. In the second branch tube 14 is disposed a cathode electrode 16. An ionizable helium gas supply container 18 coupled with the laser discharge tube 4 supplies helium gas to the discharge narrow tube 4 in order to maintain the helium gas at a constant pressure.

In FIG. 1, the gas supply container 18 is coupled with the discharge narrow tube 4 through the third branch tube 20. In FIG. 2, gas supply container 18 is coupled with the discharge narrow tube 4 through the first branch tube 10. The internal spaces of the helium gas supply container 18 and the discharge narrow tube 4 are separated by a tubular partition 22 made of quartz glass, for example. The partition 22 heats the helium gas to diffuse it and permits the diffused helium gas to pass therethrough. A heater 24 to heat the partition 22 is provided around the neck portion of the gas supply container 18 where the partition 22 is positioned. A metal receiver 26 is used for supplementing ionizable metal vapor gradually decreasing as it moves due to cataphoresis effect. The metal reservoir 26 reserves a metal 28 such as cadmium (Cd), selenium (Se), iodine (I), or Zinc (Zn). The moving velocity of the metal is approximately 1 to 1.5 mg/hr. Therefore, more than 5 g of metal must be reserved in the reservoir 26 for 5,000 hours of life time of the metal vapor laser discharge system. The metal reservoir 26 is a fourth branch tube 30 coupled with the discharge tube 4 in FIGS. 1 and 2. The fourth branch tube 30 is disposed relatively closer to the anode electrode 12 rather than the cathode electrode 16, as shown. A heater 32 is disposed around the metal reservoir 26, i.e. the fourth branch tube 30, for heating the metal reserved and to evaporate it. In order to control the heater 24 disposed around the container 18 in dependance in the helium gas pressure, it is necessary to detect the helium gas pressure in the discharge narrow tube 4. For this reason, a gas pressure detecting element 34 is used for detecting the helium gas pressure in the discharge narrow tube 4. The gas pressure detecting element 34 may be constructed by using an element of which the resistance changes with the gas pressure, such as pure tungsten or platinum wire. Although the above-mentioned laser system is of the type having a single anode and cathode electrode 12 and 16, it may be of another type having a plurality of anode and cathode electrodes, and a plurality of discharge paths in the discharge narrow tube 4.

The metal vapor laser circuit 3 will be briefly described referring to FIG. 1. The details of it will be described later referring to the same figure. The circuit includes a helium gas supply circuit 36 to control current flowing into the heater 22 of the helium gas supply container 18 in dependence on the output signal of the gas pressure detector 34 and a metal vapor supply circuit 38 to control current flowing into the heater 32 of the metal reservoir 26 depending on the voltage change between the anode and cathode electrodes. The metal vapor laser circuit further includes a cathode circuit 40 for feeding current into the cathode electrode 16 for heating the cathode electrode 16, and a constant current circuit 42 for maintaining current flowing between the anode and cathode electrodes 12 and 16, respectively at a constant value, a high voltage circuit 44 for applying a high voltage between the anode and cathode electrodes 12 and 16, and a power source for the these circuits.

Description will now be given in more detail of the metal vapor laser 2 and its associated circuit.

The pressure of ionizable helium gas filled in the discharge narrow tube 4 of the laser 2 is preferably kept at a constant value above 2 torr but below 4 torr. The preferable fixed range of the gas pressure, 2 to 4 torr, is based on the fact discovered by the present inventors. The fact is illustrated in a graph of FIG. 3 in which noise included in an optical output is scaled on the ordinate and the helium gas pressure, on the abscissa. As seen from the graph, the noise in peak-to-peak values suddenly falls at approximately 6 torr of the gas pressure. The practical laser noise is generally below 40% (p—p) so that the gas pressure must be kept below about 4 torr to obtain such a practical level of noise.

It is experimentally found that a helium gas pressure below 2 torr causes the discharge occuring in the discharge narrow tube to be very unstable. It is for this reason that the gas pressure must practically be within 2 to 4 torr. In the conventional laser it is very difficult to keep the gas pressure at such a low value. The present invention, however, overcomes this difficulty by using the helium supply container 18 for supplementing a necessary amount of helium. Continuing now with the description of FIG. 3, the graph in FIG. 3 was plotted in the following manner. Some metal vapor lasers filled with helium gas of different pressures were prepared. These lasers were driven and the optical outputs were measured. In the measurement, the laser beams were projected onto a photo diode and the output signals of the photo diode were recorded in terms of time wave shape. The peak-to-peak (p—p) value in % representing a difference between the maximum and minimum values were calculated from the time wave shape. The thus obtained values were plotted as a kind of data in FIG. 3 and extrapolated to depict a curve shown in FIG. 3. The internal diameter of the narrow tube 4 of the metal vapor laser 2 is preferably less than 2.3 mm. The laser beam irradiated from the discharge narrow tube 1 with such an inner diameter is a single mode as a transverse mode. The single mode laser beam is practically preferred to a multi mode laser beam since its application is wide. It is for this reason that such a diameter is employed. The kind of the laser beam also depends on the effective length of the discharge narrow tube 4, the length being denoted as Lo in FIG. 2. The condition for producing the single mode laser beam is as follows:

| Effective length (cm) | Inner Diameter (mm) |
| --- | --- |
| 150 | 2.3 to 2.0 |
| 100 | 2.0 to 1.6 |
| 40 | 2.0 to 1.4 |

In the above values, the lower limit of the inner diameter signifies a manufacturing limit of the discharge narrow tube 4. That is, the larger the lower limit is, the longer the effective value is, as seen from the above table. From a manufacturing view point, it is more difficult to make the diameter small, as the effective length is longer.

Generally, the helium gas pressure in the discharge narrow tube 4 is expressed by the product of the inner diameter d (mm) and the gas pressure P (torr), i.e. P×d (torr·mm). Accordingly, below 7 torr·mm (=Pd) is preferable.

Figure 4:
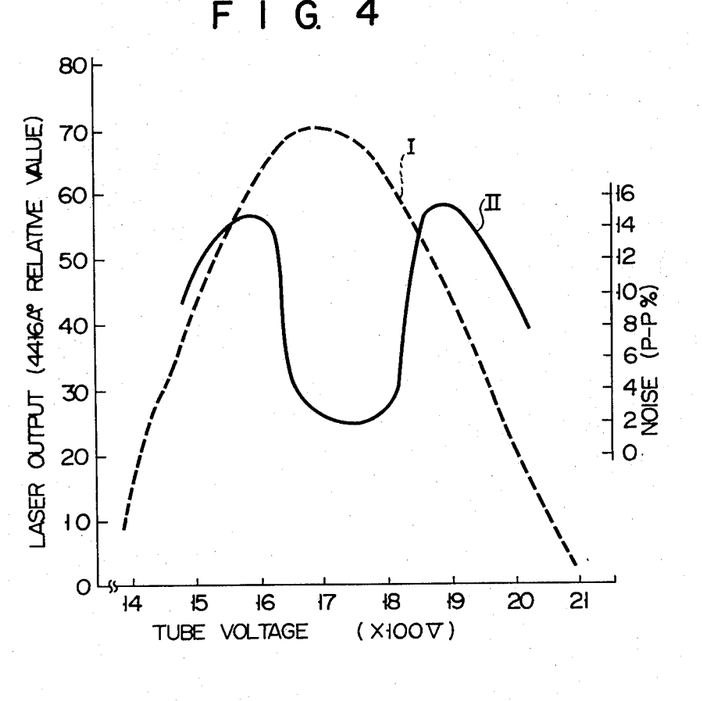
FIG. 4 shows the relations between the laser output and tube voltage and between noise and tube voltage.
Figure 5:
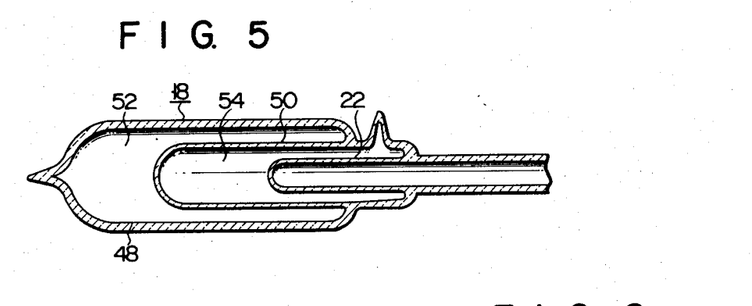
FIG. 5 shows a longitudinal cross sectional view of a helium gas supplemental container.

In a preferable metal laser 2, a voltage to provide the maximum output is applied from the high voltage circuit 44 between the anode and cathode electrodes 12 and 16. FIG. 4 shows a relationship between a laser output and a tube voltage of a helium cadmium laser and another relationship between noise and the tube voltage. The former relationship is depicted by a curve I and the latter by the curve II. The helium cadmium laser used has 2.3 torr as the helium gas pressure, 2.3 mm as the inner diameter and 60 cm as the effective length Lo. As seen from the relations, the noise remarkably reduces as the laser power is greater. For this, a fixed tube voltage to provide the maximum laser output is applied between the anode electrode 12 and the cathode electrode 16. A multi-tube structure is preferable for the helium gas container 18, as shown in FIG. 5, a double tube construction is illustrated but the construction of the container is not limited to such. As shown, an inner tube 50 is disposed in an outer tube 48. As previously stated, the helium passing partition 22, i.e. the tubular helium passing partition in the figure, is disposed in the inner tube 50. The inner tube 50 also is made of glass material permitting helium to pass therethrough. A first space 52 defined by the inner tube 50 and the outer tube 48 is filled with helium gas of high pressure, 300 to 760 torr, for example, and the space 54 defined by the inner tube 50 and the helium passing partition is filled with helium gas of medium pressure, for example, less than 200 torr.

Figure 6:
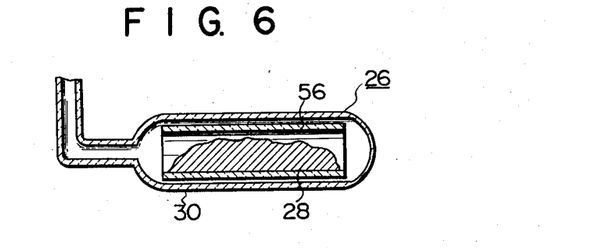
FIGS. 6 and 7 are longitudinal cross sectional views of a metal reservoir.
Figure 7:
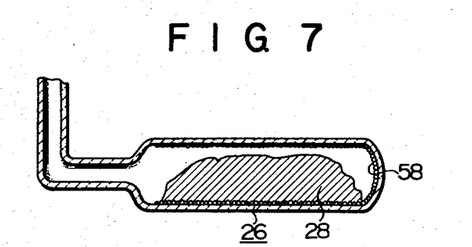

The reason why such a multi-tube structure is preferable for the helium gas container is as follows. If the container 18 is constructed by a single tube, there is a remarkable difference between the helium pressure in the laser narrow tube 4 and that in the container 18. Therefore, there is a possibility that a high pressure helium gas leaks from the container 18 to the narrow tube 4 at the normal temperature. In our experiment, it was confirmed that, when the helium gas pressure in the container 18 of a singular tube structure is 760 torr, the helium gas leaks through the partition 22 at the rate of 0.009 to 0.016 torr/hr at the normal temperature. On the other hand, when the container 18 of the multi-tube structure is filled with different pressure helium gas, such leakage of helium gas is not detected. The structures as shown in FIGS. 6 and 7 are preferably employed for the metal reservoir 26. The metal reservoir 26 in FIG. 6 includes a fourth branch tube 30 and a tubular receptacle 56 disposed in the fourth tube 30 and reserving the metal 28. The thermal expansion coefficients between the material, e.g. glass, of the metal reservoir 26 and the metal 28 are different. When the metal reservoir 26 is heated by the heater 32, thermal distortion, therefore, occurs at the contact surface between the metal reservoir 26 and the metal 28, thus resulting possibly in destruction of the metal reservoir 26. The reason why the metal reservoir 26 takes such a double tube structure is for avoiding such a destruction. The material of the inner tube may be quartz glass like the discharge narrow tube or alumina and the like.

The metal reservoir 26 shown in FIG. 7 is not provided with the inner tubular receptacle 56. Substitutionally, powdary particles are sintered on the inner surface 58 of the metal reservoir 26, i.e. the fourth branch tube 30, or the inner surface 58 is chemically etched, thereby forming a coarse surface on the inner surface. Thus, the inner surface 58 is coarse so that the metal 28 in the metal reservoir 26 does not intimately contact with the inner surface. Therefore, there is eliminated the destruction of the metal reservoir 26 due to thermal distortion.

Figure 8:
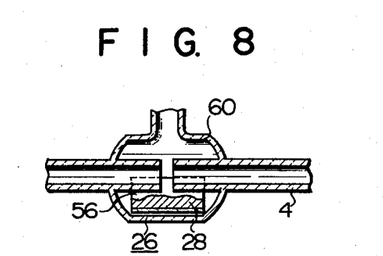
FIGS. 8 and 9 show longitudinal cross sectional views illustrating metal containers disposed coaxial with the laser discharge narrow tubes.
Figure 9:
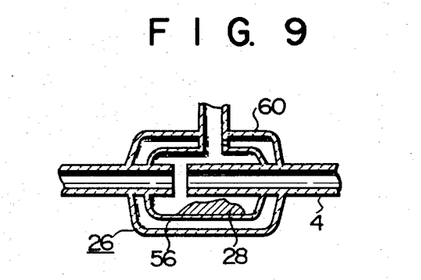

The metal reservoirs shown in FIGS. 1, 2 and 6 are all constructed by the fourth branch tube 30 extending from the discharge narrow tube 2. Substitutionally, it may be constructed by a metal container 60 coaxially coupled with the discharge narrow tube 4, as shown in FIGS. 8 and 9.

The metal container 60 shown in FIG. 7 is a hermetic container communicating with the discharge narrow tube 4, in which metal 30 is disposed in the inner receptacle 56. As shown in FIG. 8, the inner receptacle 56 is also hermetic so that the metal reservoir 26 may be constructed to be of the double tube structure. The metal reservoir mentioned above is made of the same material as that of the discharge narrow tube 4. However, if the metal reservoir 26 is made of material resistive to the thermal distortion, for example, alumina ceramic and the like, it is unnecessary to employ the construction mentioned above.

Figure 10:
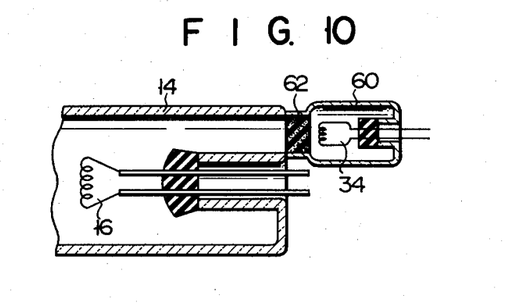
FIG. 10 shows a longitudinal cross sectional view illustrating a coupling relation of a second branch tube accommodating a cathode to an element container through a coupling element.
Figure 11:
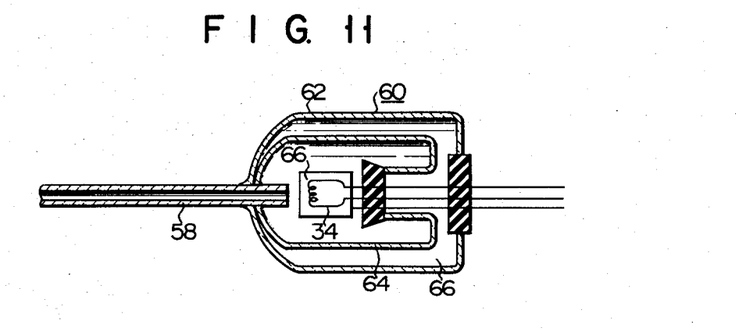
FIG. 11 shows a longitudinal cross sectional view of a preferable element container.

The helium gas pressure detecting element 34 is accommodated in a hermetic container 60 communicating with the discharge narrow tube 4 through a back discharge preventing narrow tube 58, as shown in FIGS. 1 and 2. In FIG. 2, the back discharge preventing narrow tube 58 is coupled with the second branch tube 14, disposed at the rear side of the cathode electrode 16. In other words, the back discharge preventing narrow tube 58 is disposed in such a manner that the opening end 62 of the narrow tube 14 is not positioned on the discharge path between the cathode electrode 16 and the anode electrode 12. The back discharge preventing narrow tube 58 is used to prevent the called back discharge which is undesirable and occurs between the cathode electrode 16 and the gas pressure detecting element 34. In order to reduce the conductivity for the discharge path, the physical dimension of the tube 58 has: an inner diameter smaller than that of the second branch tube 14, for example, 1 to 2 mm and a length of more than 30 mm. In FIG. 10, there is shown the element container 60 usable in place of the back discharge preventing tube 58 and a coupling element 62 providing a communication between the container 60 and the discharge narrow tube 4. The coupling element 62 is a porous material, i.e. provided with a large number of fine holes permitting gas to pass therethrough. Accordingly, both spaces of the element container 60 and the discharge narrow tube 58 which are separated by the coupling element 62 are communicable with each other but the discharge resistance between them is remarkably large. The structure shown in FIG. 11 is preferable for the element container 60. As shown, the container 60 is of the double structure type including the outer container 62 and the inner container 64. The space between the outer container 62 and the inner container 64 is under vacuum to isolate the gas pressure detecting element 34 from any thermal effect from outside. The pressure detecting element 34 in the container 64 is positioned in a tubular shield member 66 made of nickel or the like. The shield member 66 is used to protect the gas pressure detecting element 34. More specifically, if the back discharge should occur with provision of the back discharge preventing narrow tube 58, the shield member 66 serves as a discharge electrode to avoid operation of the gas pressure detecting element as the discharge electrode. For this, one end of the shield member 66 must be positioned at the front of the elements 34, i.e. closer to the open end of the narrow tube 58.

Referring again to FIG. 1, to the anode electrode 12 is connected to the high voltage circuit 44 through a resistor 70 for restricting tube current flowing between the anode and cathode electrodes. The high voltage circuit 44 is provided with a high voltage transformer 72 connected at the primary winding to a power source (not shown). The secondary winding of the high voltage transformer 72 is connected to the rectifier circuit 74 which is connected at one output to the resistor 70 and at the other output to ground. AC 100 V or 200 V is supplied to the primary side of the high voltage transformer 72 and DC 3200 V is supplied to the output side of the rectifier circuit 74.

The secondary winding of the heater transformer 76 of the cathode circuit 40 for facilitating emission of thermal electrons from the electrode 16 is connected to the cathode electrode 16. The primary winding of the same is connected to the power source.

The helium gas supply circuit 36 is inserted between the gas pressure detecting element 60 and the heater 24 of the helium gas supply container 18. The element 60 is connected to the input side of the amplifier 78 of which the output side is connected to the gate of SCR or TRIAC 80. The amplifier 78 controls the turning on and off of the SCR 80 in accordance with the signal from the element 60. The amplifier 78 is connected to the secondary winding of the heater transformer 86 through a constant voltage circuit 82 and the rectifier circuit 84 from which power is supplied to the amplifier 78. The heater transformer 86 is connected at the primary to the power source and at the secondary to the heater 22 via the SCR 80 for supplying heating current to the heater.

The metal vapor supply circuit 38 is connected at the output side to the heater 32 of the metal reservoir 26 for heating DC current supply. The heater 32 is connected to the secondary side of the heater transformer 92 through the collector-emitter path of the transistor 88 and the rectifier circuit 90. The primary winding of the transformer 92 is connected to the power source and the rectifier circuit 90 supplies power to the amplifier 94. The input side of the amplifier 94 is connected to a movable contact 100 of a voltage divider 98 connected in series with a signal resistor 96 connected to the anode electrode 12 and one end 102 of the voltage divider 98. One end of the input of the amplifier 94, i.e. the one end 102 of the voltage divider 98, serves also as a power supply terminal. The output side of the amplifier 94 is connected to the base of the transistor 88 to control the conduction of the transistor 88 in accordance with the divided voltage of the tube voltage of the laser 2 appearing at the input side and to adjust the current flowing into the heater 32.

The constant current circuit 42 is connected to the cathode electrode 16 through the secondary winding of the heater transformer 76 of the cathode circuit 40. The constant current circuit 42 is also connected to one terminal of the voltage divider 98. The constant current circuit 42 is comprised of 4 to 16 transistors 104 and a plurality of resistors 106 connected in series. The respective nodes of adjacent resistors 106 are connected to the corresponding bases of the transistors. The collector-emitter paths of the transistors 104 are connected in series to form a current path. These transistors are denoted individually as 104-1, 104-2, .... The first stage of the series transistors 104 is connected at the collector to one end of the series resistor 106 and to the secondary winding of the heater transformer 76. The transistor 104 at the final stage is connected at the emitter to the collector of the transistor 108 of which the base receives the reference voltage $V_{ref}$. The emitter of the transistor 108 is connected to the other end of the series resistor 106 and to ground through a variable resistor 110 and a resistor 112.

The operation of the metal vapor laser discharge system thus constructed will be given hereinafter.

The power source is first turned on to supply electric power to the respective circuits 36, 38, 40 and 44. The high voltage circuit 74 converts the power source voltage 100 to 200 V into a fixed high voltage, e.g. 3200 V. The converted high voltage is applied across the anode and cathode electrodes 12 and 16. Upon application of the high voltage, the tube 4 starts the initial discharge with a medium of helium gas in the narrow tube 4. At an instant that the initial discharge starts, the metal vapor supply circuit 32 feeds current to the heater 32 of the metal reservoir 26 so that the heating of the metal 28 in the metal reservoir 26 starts. When the metal 28 is heated and evaporated, a part of the metal vapor is moved to the cathode electrode 16 due to the cataphoresis effect. When the discharge narrow tube 4 is filled with metal vapor, the initial discharge transfers to the mixing discharge with the medium of the metal evaporation and the helium gas, i.e. the stationary discharge. The result is emission of a laser beam.

In the process from the initial discharge to the stationary discharge, the voltage between the anode and cathode electrode reduces by approximately 250 to 100 V. This reduction of the voltage is absorbed by the constant current circuit to keep the discharge current between the anode and cathode electrodes 12 and 16 at a constant value. More specifically, when the voltage between the anode and cathode electrodes 12 and 16 gradually reduces and the discharge current gradually increases, the current flowing into the constant current circuit 42 via the cathode electrode 16 and the secondary side of its heat transformer tends to grow. In the constant current circuit 42, when the current flowing into the circuit 42 increases, the emitter potential of the transistor increases to approach to the base potential of the transistor 108 with the reference potential applied. As a result, the emitter-collector resistance, i.e. the effective resistance, of the transistor 108 increases and thus the emitter potential of the transistor 104 rises to narrow the potential difference between it and the corresponding transistor 104. Similarly, the collector-emitter resistance of the other transistor 104 becomes large. Accordingly, the internal resistor of the constant current circuit 42 becomes small as the discharge current increases, i.e. the discharge resistance becomes small, with the result that the current flowing therethrough is kept constant. In the period from the initial discharge to the stationary discharge and after the stationary discharge, the pressure of the helium gas in the discharge narrow tube 4 gradually decreases. The reduction of the helium gas pressure is detected by the gas pressure detector element 60. The detector element 60 sends a gas pressure signal corresponding to the gas pressure reduction to the amplifier 78. In response to the signal, the amplifier 78 turns on the SCR 80 to permit current to flow into the heater 24. The heater heats the helium passing partition 22 partitioning the gas supply container 18 and the discharge narrow tube 4 to gradually supply the helium gas into the discharge narrow tube 4. When the helium gas pressure in the discharge narrow tube 4 reaches a predetermined value, for example, 3 torr, the amplifier 78 turns off the SCR 80 to cease the supply of current to the heater 24. If the preferred helium gas supply container 18 shown in FIG. 5 is used, the helium gas is surely supplied only at the necessary time. As shown in FIGS. 2, 10 and 11, if the helium gas pressure detector 34 is disposed in the container 60 communicating with the discharge narrow tube 4 through the paths with enlarged discharge resistances, the gas pressure in the tube 4 may be safely and surely detected without being accompanied by the back discharge between the cathode electrode 16 and the pressure detecting element 34.

During the stationary discharge, if the concentration of the metal vapor in the discharge narrow tube 4 suddenly falls for some reason, the discharge resistance is large and the voltage between the anode and cathode electrodes 12 and 16 tends to rise. At this time, the voltage between the moving contact of the voltage dividing resistor 98 of the metal evaporation supply circuit 38 and one end of the divider 98 rises. The voltage rise drives the amplifier 94 to provide an output signal to the gate of the transistor 88. As a result, the emitter-collector resistance of the transistor 88 decreases compared to that of it in a stationary state. Therefore, the current flowing into the heater 32 of the metal reservoir 26 increases so that the amount of the evaporating metal rapidly increases and the concentration of the metal evaporation increases in the discharge narrow tube 4. When the concentration of the metal vapor in the tube 4 reaches a predetermined value, the voltage between the anode and cathode electrodes 12 and 16 also reaches a given voltage. In a stationary state, current flows into the heater 32 so as to constantly supply a small amount of metal vapor. In this way, the metal vapor moving due to the cataphoresis effect is supplemented. If the metal reservoir 26 is constructed as shown in FIGS. 6 to 9, there is precluded the possibility of destruction of the metal reservoir 26 due to heat, ensuring the supply of the metal 28.

From the foregoing description, it will be understood that, in the metal vapor laser discharge system of the invention the helium gas pressure and the metal vapor concentration are kept at a constant value in the metal narrow tube and a constant discharge current is ensured. Therefore, stable and sure oscillation of the laser is possible and the life time of the laser per se is elongated, for example, several thousands of hours. Additionally, the helium pressure in the laser tube is relatively low so that the laser oscillates with a low noise.

What we claim is:

1. A metal vapor laser discharge system comprising a metal vapor laser discharge means and control means for said metal vapor laser discharge means;
    said metal vapor laser discharge means including:
    a laser vessel filled with an ionizable helium gas;
    anode and cathode electrodes which are disposed in said laser vessel with a space therebetween for forming a discharge path;
    a gas pressure detecting element in said laser vessel for detecting the helium gas pressure in said laser vessel and providing an output signal which is a function of the detected helium gas pressure;
    a metal reservoir containing metal for supplying an ionizable metal vapor into said laser vessel; and
    a helium gas supplemental container which is coupled with said laser vessel through a helium gas passing wall permitting helium gas to diffuse due to heating and to pass therethrough, and is filled with the helium gas at a higher pressure than that in said laser vessel; and
    said control means for said metal vapor laser discharge means including:
    constant current means which is connected between the anode and cathode electrodes and maintains substantially constant the discharge current between the anode and cathode electrodes;
    metal heating means provided around said metal reservoir;
    metal vapor supply means for controlling said metal heating means in accordance with the discharge voltage between the anode and cathode electrodes to maintain substantially constant the ionized metal vapor in said laser vessel; and
    helium gas supplemental means for controlling the heating means for heating said helium gas passing wall of said helium gas supplemental container in accordance with the output signal from said gas pressure detecting element to maintain substantially constant the helium gas pressure in said laser vessel.

2. The metal vapor laser discharge system of claim 1, wherein said laser vessel comprises a discharge narrow tube and first and second branch tubes communicating with said discharge narrow tube and provided near respective opposite ends of said discharge narrow tube, said anode and cathode electrodes being disposed in the first and second branch tubes respectively.

3. The metal vapor laser discharge system of claim 1, wherein said laser discharge means further comprises an element accommodating a container in which said gas pressure detecting element is disposed, and a connected means having a large discharge resistance and coupled between said container and said vessel to connect the discharge path to the space of said container.

4. The metal vapor laser discharge system of claim 3, wherein said connecting means comprises a narrow tube with a small diameter coupled between said laser vessel and said element accommodating said container.

5. The metal vapor laser discharge system of claim 3, wherein said connecting means comprises a porosity means inserted between said laser vessel and said element accommodating said container.

6. The metal vapor laser discharge system of claim 2, wherein said laser discharge means further comprises an element accommodating a container in which said gas pressure detecting element is disposed, and a connecting means having a large discharge resistance and coupled between said container and said second branch tube so as to connect the discharge path to the space of said container, to thereby prevent a discharge current from flowing through said gas pressure detecting element and to prevent said gas pressure detecting element from being deteriorated by said metal vapor.

7. The metal vapor laser discharge system of claim 1, wherein the helium gas pressure in said laser vessel is below 6 torr.

8. The metal vapor laser discharge system of claim 2, wherein the inner diameter of said discharge narrow tube is less than 2.3 mm.

9. The metal vapor laser discharge system of claim 1, wherein said helium gas supplemental container is of multitube structure which comprises an inner container and partitioned hermetic spaces, said inner container being made of a helium passing wall permitting helium gas to diffuse due to heating and to pass therethrough, and the respective partitioned hermetic spaces being filled with high pressure helium gas with different pressures.

10. The metal vapor laser discharge system of claim 1, wherein said metal reservoir is a container communicating with said laser vessel, said container being disposed near said anode and being provided therein with means for preventing metal contained therein from intimately contacting with the inner surface of said container.

11. The metal vapor discharge system of claim 10, wherein said laser vessel comprises a discharge narrow tube and first and second branch tubes communicating with said discharge narrow tube and provided near respective opposite ends of said discharge narrow tube, said anode and cathode electrodes being disposed in the first and second branch tubes respectively.

12. The metal vapor laser system of claim 10, wherein said intimate contact preventing means comprises an inner container accommodated in said first-mentioned container and in which said metal is received.

13. The metal vapor laser system of claim 10, wherein said intimate contact preventing means comprises a coarse surface formed in the inner surface of said container.

14. The metal vapor laser system of claim 10, wherein said metal vapor laser is a helium cadmium laser.

* * * * *